Figure 1:
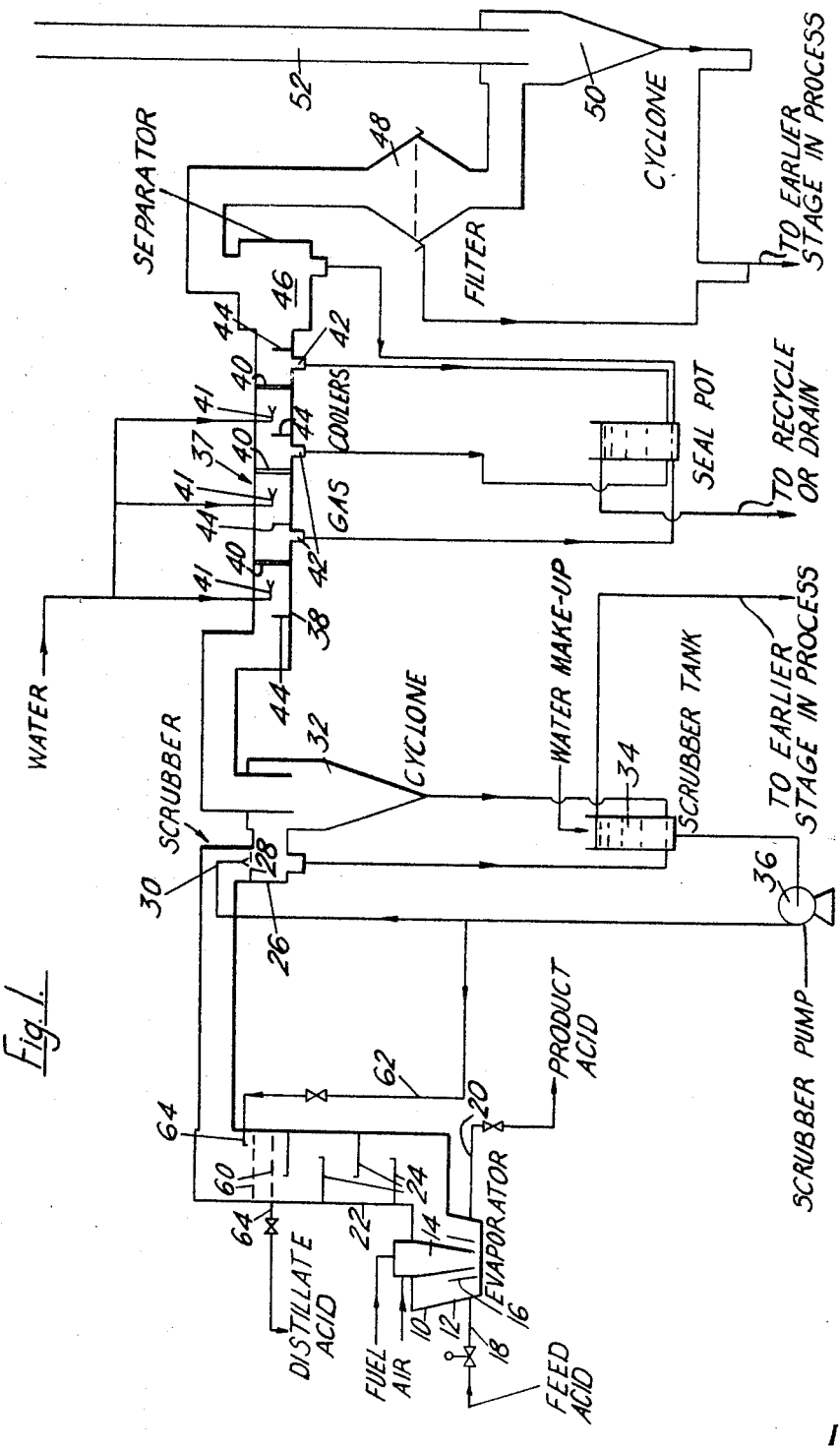

United States Patent

[11] 3,522,833

[72] Inventors: William R. Mustian, Jr.
 Lakeland, Florida;
 James Austin, Maidenhead,
 England; John D. Ellis, Lakeland,
 Florida
[21] Application No.: 796,280
[22] Filed: Jan. 21, 1969
[45] Patented: Aug. 4, 1970
Continuation of Ser. No. 690,689, Dec. 13, 1967, which is a continuation of Ser. No. 471,999, July 14, 1965.
[73] Assignee: Occidental Research &
 Engineering Ltd.
 London, England
 a Corp. of England
[32] Priority: July 21, 1964
[33] Great Britain
[31] No. 29,524/64

[54] PRODUCTION OF PHOSPHORIC ACIDS
 3 Claims, 2 Drawing Figs.
[52] U.S. Cl. .................................................. 159/16,
 159/47, 23/165
[51] Int. Cl. .................................................. B01d 1/14
[50] Field of Search ....................................... 159/16, 47;
 23/165
[56] References Cited
UNITED STATES PATENTS
3,104,947  9/1963  Switzer et al. ................  159/16X Primary Examiner— Norman Yudkoff
Assistant Examiner— J. Sofer
Attorney—Ward, Mc Elhannon, Brooks & Fitzpatrick ABSTRACT: Phosphoric acid concentration process comprising releasing hot combustion products below the surface of a phosphoric acid solution to concentrate the acid to a $P_2O_5$ content of at least 68% (IFB) and produce a phosphoric acid-containing gaseous effluent having gross particulate contaminants, removing such contaminants and subsequently passing the phosphoric acid-containing effluent through a gas/liquid contacting device irrigated with aqueous liquid irrigant selectively to condense and absorb substantially fluoride-free phosphoric acid vapor to form substantially pure phosphoric acid distillate solution, and recovering the distillate; and apparatus particularly adapted to carry out such process.

U.S. PATENT 3,522,833
PRODUCTION OF PHOSPHORIC ACIDS

This application is a continuation of S. N. 690,689 filed Dec. 13, 1967, which in turn is a continuation of Serial Number 471,999 filed 7-14-65.

This invention concerns the production of phosphoric acids, in particular phosphoric acids of high $P_2O_5$ content. For the purposes of this Specification, the expression "phosphoric acids of high $P_2O_5$ content" is to be understood as meaning phosphoric acids containing not less than 68% $P_2O_5$ w/w on an impurity-free basis (IFB) (calculated as the percentage by weight of $P_2O_5$ in relation to the total weight of $P_2O_5$ plus both free and combined water in the acid concerned) and includes the acids known as "superphosphoric acids" having $P_2O_5$ contents in the range 68-79% w/w (IFB), acids having $P_2O_5$ contents in the range 79-89% w/w (IFB) which may conveniently be called "astrophosphoric acids" and acids containing in excess of 89% w/w $P_2O_5$ (IFB), called "ultraphosphoric acids" herein.

The commercial production of phosphoric acids is generally undertaken by one of two general procedures, viz. the "wet process" in which bone ash or, more usually ground phosphate rock, containing apatite ($3Ca_3(PO_4)_2 \cdot CaF_2$) and/or tricalcium phosphate ($Ca_3(PO_4)_2$) is digested with dilute mineral acid (e.g. sulphuric acid) to produce a weak orthophosphoric acid solution and a calcium salt which is then separated from the solution by an appropriate technique; and the "furnace process" The "wet process" acid is normally produced at low strength (e.g. 27-33% $P_2O_5$ w/w (IFB) ) and although it should desirably be concentrated to higher strengths prior to use in, for instance, the production of fertilizer compositions it is nevertheless a very convenient, readily available and economic material for bulk production of fertilizer and other phosphate compositions.

The present invention is, therefore, primarily concerned with the concentration of wet-process phosphoric acids to high $P_2O_5$ contents for subsequent conversion to concentrated phosphate-containing compositions, such as fertilizers.

Generally, wet-process phosphoric acid has, as noted, a $P_2O_5$ content in range 27-33% w/w (IFB) the $P_2O_5$ being substantially entirely present in the form of orthophosphoric acid ($H_3PO_4$). It also contains impurities such as calcium, iron, aluminium, magnesium and other metals together with fluorine compounds and other contaminants, the amount and nature of the impurities depending upon the raw materials used in its preparation. Concentration of this weak acid to higher strengths involves evaporation of the water of solution and for concentration to $P_2O_5$ contents of up to about 68% w/w (IFB) many evaporation techniques are available. In selecting an evaporation technique for this purpose, account must be taken of the corrosive naure of the acid, which involves problems in the selection of materials of construction, and also of the problem of scale formation on heat transfer surfaces since the impurities in the acid are such as to conduce to the rapid accretion of a hard scale of calcium salts (sulphate and phosphate) on any high temperature surfaces in contact with the acid. For these reasons, techniques involving indirect heating of the acid are difficult to apply and tend to have a low thermal efficiency.

Evaporation by submerged combustion and analogous techniques, in which heating is accomplished by direct exposure of the liquid to hot combustion products and which are of very high thermal efficiency, would, on the other hand, appear to avoid the problem of scale formation on heat transfer surfaces, ease the problem of selecting constructional materials and also show high thermal efficiency and other economic advantages in concentrating wet-process phosphoric acid. However, this application of such techniques has up to recently been prevented by the problem of dealing satisfactorily and economically with the noxious effluent that would be produced by the evaporator but this problem has now been overcome by the effluent-treatment apparatus disclosed in copending Application Serial No. 440184, filed 3-15-65, subsequently continuation application No. 681,938, filed Nov. 9, 1967 and now patent No. 3,439,475.

The problems involved in concentrating wet-process phosphoric acid to $P_2O_5$ contents above about 68% w/w (IFB) are considerably more severe than those involved in concentrating such acid up to about this strength. Not only are there greater problems in selecting suitable materials of construction capable of withstanding the higher temperatures and more corrosive conditions imposed, but, in addition, the problems of scale formation on heat transfer surfaces are much increased by the tendency of hot concentrated phosphoric acid to form insoluble polyphosphates and metaphosphates with certain of the impurities normally found in the wet-process acid.

Thus it should be recalled that phosphoric acid exists in many forms; there are, for instance orthophosphoric acid ($H_3PO_4$), pyrophosphoric acid ($H_4P_2O_7$), polyphosphoric acids (three or more orthophosphoric acid units condensed with elimination of water molecules) and metaphosphoric acid ($HPO_3$) which occurs in cyclic polymers (see "Phosphorus and its Compounds" Vol. 1, by John R. Van Wazer, published by Interscience (New York), (1958). Pure aqueous solutions of $P_2O_5$ in concentrations up to about 68% w/w contain substantially only orthophosphoric acid; above this $P_2O_5$ content, increasing amounts of pyrophosphoric acid and other polyphosphoric acids appear. For instance at a $P_2O_5$ content of 79% w/w, the solution may be found to contain 20% orthophosphoric acid, 46% pyrophosphoric acid, 20% tripolyphosphoric acid, 8% tetrapolyphosphoric acid, 3% pentapolyphosphoric acid and 1% hexapolyphosphoric acid. At a $P_2O_5$ content of 84% w/w the proportion of orthophosphoric acid has fallen to about 3% and the proportion of pyrophosphoric acid to 10%, the bulk of the $P_2O_5$ being present in the form of polyphosphoric acids, those polyphosphoric acids including ten or more orthophosphoric acid units accounting for at least 25% of the $P_2O_5$ content. At a $P_2O_5$ content greater than 87% w/w the constitution changes, concentrates having $P_2O_5$ contents rising above this value consisting to increasing extents of cross-linked polyphosphoric acids and polymers of metaphosphoric acid units.

During concentration of phosphoric acid solutions by evaporation, local high temperatures and concentration gradients effect the proportional distribution of the various forms of the acid; in concentrating a wet-process acid, the normal impurities found therein include calcium, iron and aluminium cations which react with the higher polyphosphoric and polymeric metaphosphoric acids to form insoluble compounds the formation of which conduces to the formation of such forms of the acid by disturbing the equilibrium distribution of the various forms of the acid. Thus the concentration of wet-process acid to $P_2O_5$ contents in excess of about 68% w/w (IFB) leads to the formation of unexpectedly large amounts of insoluble polyphosphates and metaphosphates as hard scale on heat-transfer surfaces of the evaporator.

For this reason, evaporation techniques involving indirect heat transfer to the acid are, as a practical matter, entirely ruled out for the large-scale, economic concentration of wet-process phosphoric acid to $P_2O_5$ contents above about 73% w/w (IFB). For such purposes a submerged combustion or analogous technique is essential.

The pioneer work of the Tennessee Valley Authority (T.V.A.) demonstrated the feasibility of employing submerged combustion or analogous evaportation techniques to concentrate wet-process phosphoric acid to $P_2O_5$ contents significantly above 68% w/w and also indicated certain problems that would arise in an attempt to commercialize such a process. Thus this work, performed with a relatively small-scale pilot plant, indicated that the evaporator exhaust effluent would contain increasingly large amounts of valuable phosphorus and other contaminants as the evaporation temperature was raised to achieve product acids of higher $P_2O_5$ content, indicating a severe problem in treating such effluent to recover at least the valuable phosphorus content thereof. The work also indicated a need to minimise retention of the product at high temperature in the evaporator in oder to minimise the formation of insoluable polyphosphates and metaphosphates the formation of which, as noted above, is promoted by high temperatures. However, because of the relatively small scale of the pilot plant used, T.V.A. did not encounter another problem, excessive formation of insoluble polyphosphates and metaphosphates in the product, that attends attempts to effect concentration of phosphoric acid on a large scale to high $P_2O_5$ contents.

As noted, the work of T.V.A. indicated that the application of submerged combustion and analogous techniques to concentrating such acid to $P_2O_5$ contents above 68% w/w (IFB) would involve severe problems in dealing with the evaporator effluent. The expected major effluent contaminates are phosphorus, fluorine and sulphur compounds. Experiment has borne out this expectation and has also shown that such contaminants appear in different relative amounts in the effluent from an evaporator fed with an acid having a $P_2O_5$ content of about 54% w/w and concentrating such acid to a $P_2O_5$ content of about 80% w/w (IFB) as compared with their proportion in the effluent of an evaporator fed with an acid of 30% w/w $P_2O_5$ content and concentrating such acid to a $P_2O_5$ content of about 54% w/w.

Thus experiment shows that during concentration of a 30% w/w $P_2O_5$ wet-process acid to a $P_2O_5$ content of up to about 54% w/w, the bulk (about 80%) of the fluorine content is driven off in the evaporator effluent so that the flourine compound content of the effluent of an evaporator fed with acid of 54% w/w $P_2O_5$ content is relatively low.

On the other hand, experiment has shown that the proportion of phosphorus compounds in the effluent rises markedly with increasing $P_2O_5$ contents in the acid produced in the evaporator, phosphoric acid tending to distil in quantity in the effluent as the $P_2O_5$ content of the evaporator product rises above about 79% w/w (IFB).

We have found, however, these effluent problems, although different from those exhibited in concentrating wet-process acid to $P_2O_5$ contents up to about 54% w/w, are nevertheless susceptible of solution.

Thus in the Specification of co-pending Application No. 440185 filed 3-15-69 now patent 3,276,510 there is disclosed a process for obtaining phosphoric acids of high $P_2O_5$ content, this process involving submerged combustion or analogous evaporation of a wet-process phosphoric acid solution with the aid of characteristic procedures for treating the gaseous effluent of the evaporator to recover valuable constituents thereof and substantially to eliminate noxious contaminants in effective and economic manner. Moreover, in the Specification of co-pending Application No. 471,998 filed July 14, 1965, now abandoned, there is disclosed a process, for the same purpose, involving effecting the desired concentration in a plurality of successive stages by the aid of submerged combustion or analogous evaporators in a direct cascade arrangement, this process being capable of achieving a final acid product having a very low content of insoluble phosphate compounds.

Further, in the Specification of co-pending Application No. 440239, filed 3-16-65, now patent 3,276,443 there is disclosed a burner arrangement, and an evaporator embodying same, for use in effecting submerged combustion or analogous evaporation of liquids under conditions such as to minimise local over-concentration of the liquid and its exposure to high temperature and thereby of utility in the processes of the above-mentioned co-pending Applications when it is desired to produce phosphoric acids of high $P_2O_5$ content with minimum contents of the aforesaid insoluble phosphate compounds.

As noted hereinabove, concentration of phosphoric acid solutions to $P_2O_5$ contents in excess of about 79% w/w (IFB) by submerged combustion or analogous techniques gives rise to an evaporator effluent that contains very substantial quantities of phosphoric acid vapour. This is an embarrassment to the effluent-treating equipment and in the Specifications of the aforesaid co-pending Applications there are disclosed certain techniques for mitigating this embarrassment.

The object of the present invention is to provide a process involving submerged combustion or like evaporation of phosphoric acid solutions (e.g. wet-process phosphoric acid solutions) to high $P_2O_5$ contents with recovery, as a valuable intermediate, of phosphoric acidc vapour appearing in the evaporator effluent.

Thus the present invention provides a process comprising concentrating, to a $P_2O_5$ content of at least 79% w/w (IFB), a phosphoric acid solution in a submerged combustion or analogous evaporator and causing the gaseous effluent of such evaporator to pass through at least one gas/liquid contacting device irrigated with water or a phosphoric acid solution in such manner as to condense and absorb phosphoric acid vapour in the effluent, and recovering the phosphoric acid solution so obtained.

The process of the invention may be performed in several manners, depending upon the desired end use of the (enriched) phosphoric acid solution obtained by condensation and absorption of phosphoric acid vapour distilling in the evaporator effluent.

Thus, in one form of the invention, the evaporator effluent is led to the irrigated contacting device(s) via an upwardly extending duct of such cross-section as to give a low effluent velocity, such duct being fitted with baffles and/or louvres adapted to deflect the effluent in its path up the duct thereby to cause deposition of gross liquid and solid particulate contaminants entrained in the effluent. Performing the invention in this manner will give rise to phosphoric acid solution that will, however, contain amounts of contaminants, washed out of the effluent, depending upon the impurities contained in the solution fed to the evaporator, and the efficiency of the disentrainment baffles and/or louvres in the off-take duct.

Thus if the evaporator is fed with a wet-process phosphoric acid concentrate having, for instance, a $P_2O_5$ content of about 54% w/w, such form of the invention can give rise to a phosphoric acid solution broadly equivalent to an industrial grade acid that may need further purification for certain end-uses but which, nevertheless, may attain a $P_2O_5$ content of up to perhaps 72% w/w with very low content of insoluble polymeric phosphate compounds and be directly useful for a number of purposes, for instance the preparation of detergent compositions.

In another form of the invention, however, the evaporator effluent is first passed through a more efficient separating device, such as a cyclone, adapted to eliminate from the effluent substantially all except the finest drop sizes of the entrained particulate (liquid and solid) contaminants before the effluent is passed through the irrigated contacting device(s), In this manner the absorption of impurities by the water or phosphoric acid solution irrigating such device(s) is minimised, making it possible to obtain a high quality phosphoric acid solution with a $P_2O_5$ content in the range 50-72% w/w.

It will be understood that following condensation and absorption of phosphoric acid vapour on the contacting device(s), the effluent must be treated to recover and/or substantially eliminate the residual contaminants therein. This is best accomplished by the procedures described in the Specification of the aforesaid co-pending Application No. 440,185, filed Mar. 15, 1969, now patent 3,276,510.

When such procedures are employed, the phosphoric acid solution used in the scrubber for absorption of phosphorus compounds in the effluent may be employed also to irrigate the contacting device(s); the irrigation solution may in such case also include the liquid separated from the final effluent by the filter and cyclone arrangement described in said Specification.

When a phosphoric acid solution is used for irrigation of the contact device(s), it conveniently has a $P_2O_5$ content in the range 5-20% w/w; when as is preferred, the effluent is subsequently treated by the procedures disclosed in the Specification of the aforesaid co-pending Application No. 440,185, it will be understood that the acid solution sprayed on the scrubber barrier in such procedures may be of reduced $P_2O_5$ content and at a lower temperature, as compared with the case of treating the raw evaporator effluent directly by such procedures, since the process of the present invention reduces to substantial extent the phosphorus compound content and temperature of the effluent entering the scrubber duct.

Figure 2:
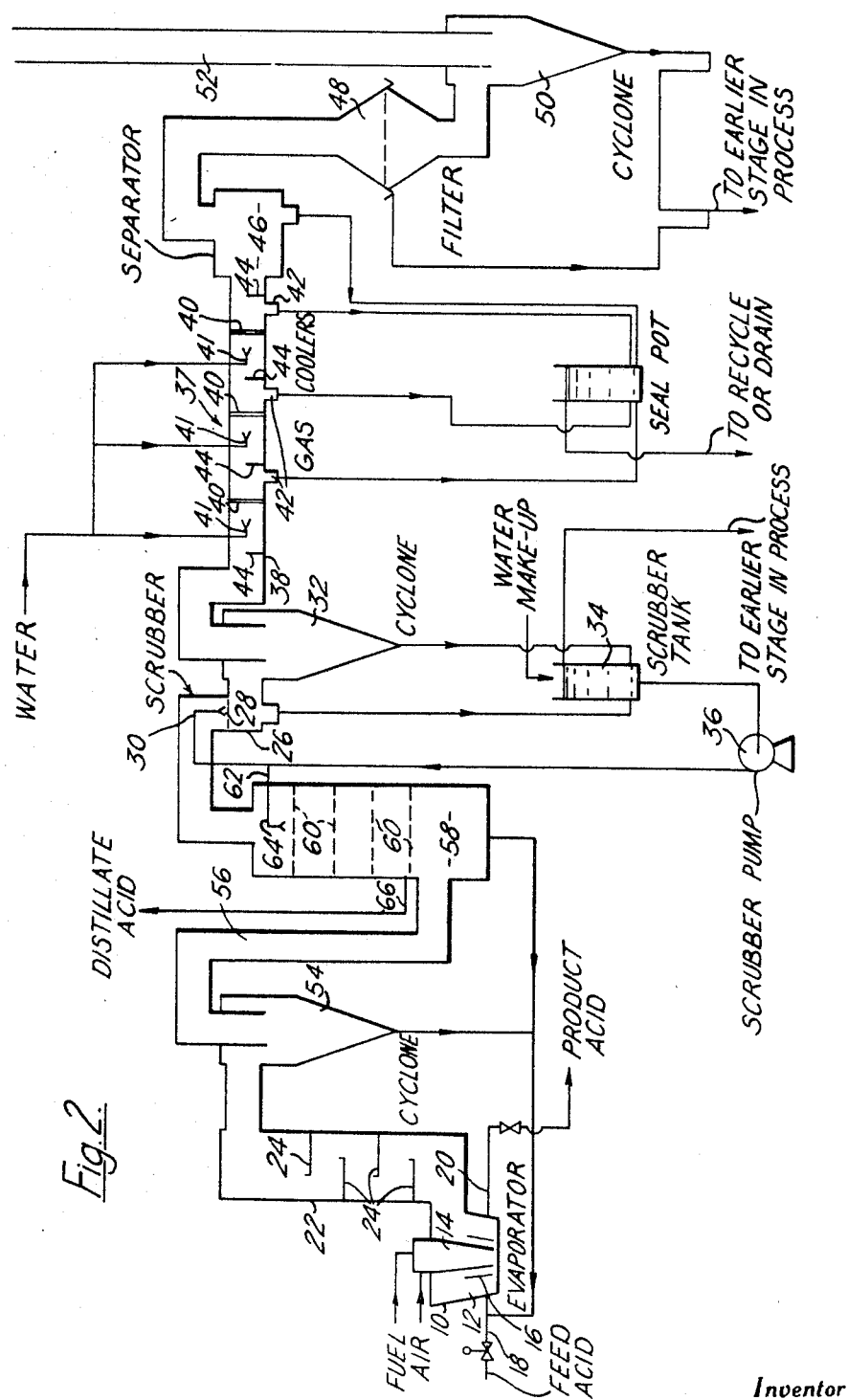

The invention will be further explained with reference to the accompanying drawings, in which:

FIGURE 1 is a flow-sheet diagram of one form of apparatus for performing the process of the invention; and FIGURE 2 is a similar diagram of another form of apparatus for performing the process of the invention.

In both Figures of the accompanying drawings common components of the illustrated apparatus have been given the same reference. Thus in both forms of the illustrated apparatus there is a submerged combustion or analogous evaporator 10 comprising a suitable vessel defining a hot well 12 into which a dip tube 14 depends, the dip tube being either supplied with hot combustion products, to be discharged below the surface of acid in the hot well 12, from an external combustion chamber, or incorporating a combustion chamber in its head, to which chamber fuel (gaseous or liquid) and air is supplied In the drawings the latter arrangement is diagrammatically illustrated.

Preferably the evaporator 10 is constructed in the form disclosed in the specification of co-pending Application No. 440239, filed 3-16-65, now patent 3,276,443, eapecially when a product acid of low insoluble phosphate compound content is desired, and includes a shroud 16 surrounding the lower portion of the dip tube 14 for the purposes described in such Specification.

As illustrated, the evaporator 10 includes a feed acid inlet 18 and a product acid outlet 20, both communicating with the hot well 12, and a vertical, low velocity, gaseous effluent duct 22 equipped with disentrainment baffles 24 for disentraining liquid from the effluent ascending in the duct 22, as more fully described in the Specification of said co-pending Application No. 440185, now patent 3,276,510.

In both forms of the illustrated apparatus there is an effluent-treating system that is more fully described in the Specification of co-pending Application No. 440185, now patent 3,276,510 and which comprises a scrubber duct 26 through which the effluent flows downwardly, this duct 26 being obturated by a barrier 28 having circular apertures therein, such apertures having diameters in range 1/8 inch to 1 inch and conveniently about 1/2 inch, the size and number of the apertures being such that the effluent flows through each aperture at a velocity in the range 300-350 feet per second with a pressure drop across the barrier in the range 35-40 inches w.g. Upstream of the barrier 28, a spray nozzle 30 is arranged to project a solid cone coarse spray of phosphoric acid solution at the barrier to cause droplets of such solution to move generally parallel with the barrier so as to intercept and intimately mix with the effluent flowing through the barrier apertures. This solution has a $P_2O_5$ content and temperature such as to achieve maximum absorption of phosphorus compounds in the effluent. The solution may, for instance, have a $P_2O_5$ content in the range 5 - 20% w/w.

Downstream of the barrier 28, the scrubber duct 26 leads to a separator 32 such as a cyclone; in this the phosphoric acid solution is separated from the effluent and is returned to a tank 34 for recirculation by a pump 36 to the spray nozzle 30. To maintain the required $P_2O_5$ content in the solution, acid is continuously drawn from the tank 34 and replaced by water, the withdrawn acid conveniently being added to the evaporator feed.

The effluent leaving the separator 32 passes to a three-stage gas cooler 37 constituted by a horizontal duct 38 having three barriers 40 therein, each with apertures which are substantially circular with a diameter in the range 1/2 inch to 1 inch and conveniently about 1/2 inch, the number and size of the apertures in each barrier 40 being such that the effluent flows through the apertures therein at a velocity in the range 80-100 feet per second (preferably about 85 feet per second) with a pressure drop across the barrier 40 not exceeding about 4 inches w.g. (preferably about 3 inches w.g.).

Upstream of each barrier 40 a spray nozzle 41 is arranged to project a solid cone spray of cold water at the barrier to impinge thereon and produce droplets that move generally parallel with the barrier to intercept and mix intimately with the effluent, flowing through the barrier apertures, to cool same and extract the bulk of the residual phosphorus, sulphur and fluorine compounds therefrom. The duct 38 is provided with appropriate drains 42, for removal of the sprayed water, and plates 44 obturating the lower part of the cross-section of the duct to prevent backflow of water to the separator 32.

Downstream of duct 38, the effluent is passed through a separator box 46 and thereafter through a fibre filter 48 to effect agglomeration of fine mist-like particles in the effluent and thereafter the effluent passes to a cyclone 50 or like separator to remove the droplets formed by such agglomeration, the effluent then passing to a stack 52 for discharge to atmosphere.

Referring now specifically to the form of apparatus illustrated in FIGURE 1 1, the off-take duct 22 of the evaporator is fitted, near its upper end, with a pair of gas/liquid contact plates 60 which may be of any convenient form, such as bubble-cap plates, that are irrigated by a solution of phosphoric acid which by contact with the effluent ascending in the duct 22 condenses and absorbs much of the phosphoric acid vapour present in the effluent. Conventiently the phosphoric acid solution for irrigating the plates 60 is the same solution as fed to the spray nozzle 30 of the scrubber, being drawn from the tank 34 by the pump 36 and fed by a conduit 62 to a suitable irrigant inlet 64 of the upper plate 60.

The enriched phosphoric acid solution ("distillate acid"), is withdrawn from the lower plate 60 through a suitable valved outlet 66. This "distillate acid" may have a $P_2O_5$ content ranging up to perhaps 72% w/w with a very low content of insoluble phosphate compounds and a purity broadly equivalent to an industrial grade acid. Its purity will, of course, be related to the purity of the irrigant solution fed to inlet 64 and, moreover, such "distillate acid" will usually contain various impurities resulting from absorption of particulate and droplet contaminants entrained in the effluent ascending in the duct 22.

A "distillate acid" of higher purity may be more readily obtained by the employment of the form of apparatus illustrated in FIGURE 2. In the apparratus shown in this figure the duct 22 of the evaporator is connected to a separator 54, conveniently a cyclone, adapted to eliminate from the evaporator effluent substantially all except the finest drop sizes of the entrained liquid and solid particulate contaminants thereof. The effluent leaving the separator 54 then passes via duct 56 to a tower 58 to ascend therein through a plurality of contact plates 60 located in such tower (instead of in the duct 22 as in the FIGURE 1 arrangement) before entering the scrubber duct 26. The contact plates 60 are of any suitable form, being for instance bubble-cap plates, irrigated by a phosphoric acid solution introduced through an inlet 64. The "distillate acid" is withdrawn through a suitable outlet 66.

As in the case of the arrangement of FIGURE 1, the irrigant phosphoric acid solution may, as shown in FIGURE 2 be the same as that fed to the spray nozzle 30 of the scrubber. However, because of the removal of contaminants from the effluent by the separator 54, the "distillate acid" will be purer, for a given purity of the irrigant solution, than that obtained with the apparatus of FIGURE 1, and if the irrigant solution is of good purity an extremely pure "distillate acid" may be obtained with the apparatus of FIGURE 2. The "distillate acid" may have a $P_2O_5$ content ranging up to about 72% w/w and will usually have a $P_2O_5$ content in the range 50-72% w/w.

It should be understood that by the process of the present invention, one of the major contaminants, (phosphoric acid vapor), in the effluent of a submerged combustion or analogous evaporator concentrating phosphoric acid to a high $P_2O_5$ content is recovered in a form that is of considerable commercial utility and that such recovery considerably relieves the load on the subsequent effluent-treating system, enabling such system very effectively to remove residual contaminants from the effluent before final discharge of such effluent into the atmosphere.

The following tabulation illustrates the performance of the invention, the tabulation setting forth the experimental results obtained in a series of runs using (runs 1 to 3) apparatus arranged generally as described with reference to FIGURE 1 of the drawings and (runs 4 and 5) apparatus arranged generally as described with reference to FIGURE 2 of the drawings. In each such arrangement, the evaporator 10 was constructed as described in detail in the specification of co-pending Application No. 440239 having the dimensions disclosed in such specification.

| Run | 1 | 2 | 3 | 4 | 5 |
|---|---|---|---|---|---|
| Evaporator feed: | | | | | |
| $P_2O_5$, tons/day | 100 | 100 | 130 | 115 | 100 |
| $P_2O_5$, percent w./w | 54.8 | 54.8 | 53.1 | 54.8 | 54.8 |
| $SO_3$, percent w./w | 4.2 | 4.2 | 4.3 | 4.2 | 4.2 |
| Fluorine, percent w./w | 0.6 | 0.6 | 0.6 | 0.6 | 0.6 |
| $Fe_2O_3+Al_2O_3$, percent w./w | 3.2 | 3.2 | 2.3 | 3.2 | 3.2 |
| Water-insoluble solids, percent w./w | 1.2 | 1.2 | 1.03 | 1.2 | 1.2 |
| Evaporator product: | | | | | |
| $P_2O_5$, percent w./w | 75.4 | 78.5 | 76.0 | 75.04 | 78.1 |
| $SO_3$, percent w./w | 0.3 | 0.1 | 0.2 | 0.3 | 0.1 |
| Fluorine, percent w./w | 0.2 | 0.05 | 0.19 | 0.2 | 0.05 |
| $Fe_2O_3+Al_2O_3$, percent w./w | 4.4 | 4.6 | 2.80 | 4.4 | 4.5 |
| Water-insoluble solids, percent w./w | 0.8 | 1.8 | 0.67 | 0.8 | 1.65 |
| Effluent: $P_2O_5$, tons/day | 14.7 | 17.5 | 24.0 | 16.9 | 17.0 |
| Irrigant: | | | | | |
| $P_2O_5$, percent w./w | 18.4 | 18.1 | 18.5 | 17.8 | 18.0 |
| $SO_3$, percent w./w | 11.1 | 10.5 | 11.3 | 10.8 | 10.6 |
| Fluorine, percent w./w | 1.0 | 1.6 | 0.95 | 1.0 | 1.4 |
| $Fe_2O_3+Al_2O_3$, percent w./w | 0.05 | 0.03 | | 0.03 | 0.02 |
| Water-insoluble solids, percent w./w | 0.0 | 0.0 | 0.0 | 0.0 | 0.0 |
| Distillate acid: | | | | | |
| $P_2O_5$, tons/day | 14.5 | 17.3 | 23.7 | 16.6 | 16.8 |
| $P_2O_5$, percent w./w | 71.5 | 65.0 | 69.0 | 67.5 | 62.5 |
| $SO_3$, percent w./w | 0.01 | 0.05 | 0.03 | 0.04 | 0.06 |
| Fluorine, percent w./w | 0.0 | 0.0 | 0.0 | 0.0 | 0.0 |
| $Fe_2O_3+Al_2O_3$, percent w./w | 0.20 | 0.12 | | 0.1 | 0.08 |
| Water-insoluble solids, percent w./w | 0.0 | 0.0 | 0.0 | 0.0 | 0.0 |

Referring to the tabulated results, it should be noted that the analyses of the evaporator product and of the irrigant (fed to inlet 64) are those established after the run had progressed to an equilibrium operating condition, the irrigant in particular having attained its equilibrium constitution derived from the addition to a pure water make-up, to tank 34, of materials scrubbed from the effluent passing through the scrubber duct 26. Thus it should be noted that the irrigant, drawn from the tank 34, contained no water-insoluble solids and (particularly in runs 4 and 5 wherein the cyclone separator 54 served to eliminate, to a substantial extent, carry-over of liquid from the evaporator to the contact plates 60) very little iron and aluminium to contaminate the "distillate acid" obtained.

Moreover, although the irrigant contained substantial amounts of sulphur (as $SO_3$) and also appreciable amounts of fluorine, both scrubbed from the effluent in the scrubber duct 26, it should be noted that the "distillate acid" contained only traces of sulphur and no fluorine since most of the sulphur and all of the fluorine in the irrigant is vaporized by the heat-excange occurring on plates 60 and carried on to the scrubber duct 26.

Thus the tabulated results demonstrate clearly the potentiality of the process of the invention for producing substantial amounts of a "distillate acid" containing extremely small amounts of sulphur, iron and aluminium as contaminants and containing neither fluorine nor water-insoluble solids. Such a "distillate acid" is thus of a purity considerably greater than that obtainable by evaporative concentration of wet-process phosphoric acid and has, therefore, many uses for which the evaporator product would be unsuitable without special purification processes that would considerably raise the cost of the evaporator product. Moreover, the "distillate acid" is produced as a direct by-product of the evaporative concentration process for a negligible increase in the overall cost of such process. Indeed, because the production of "distillate acid" relieves the load on the scrubber of the effluent-treating plant, the efficiency of the latter is raised and in a plant designed for performance of the process of the invention the increase in capital cost due to the provision of the equipment for obtaining the "distillate acid" may be offset by capital cost savings in the remainder of the effluent-treating plant.

Finally, it should be noted that in the tabulated data, the evaporator product had, in all runs, a total $P_2O_5$ content less than the equivalent of 79% w/w (IFB) at which value the evaporator effluent commences to contain very large quantities of phosphoric acid vapour; thus the tabulated data significantly demonstrates that with evaporator product acids in the approximate range 68-79% $P_2O_5$ (IFB) the amount of phosphoric acid vapour in the evaporator effluent is sufficient to provide for substantial production of the desirable "distillate acid". When the evaporator product has a $P_2O_5$ content in excess of about 79 w/w (IFB) the amounts of "distillate acid" obtainable by the process of the invention are greater, rising rapidly with rising evaporator product $P_2O_5$ content.

We claim:

1. A process comprising concentrating to a $P_2O_5$ content of at least 68% (IFB) by weight a wet-process phosphoric acid solution containing fluorine compound contaminants by releasing hot combustion products below the surface of a body of such solution in a heating zone to produce a phosphoric acid vapor and fluorine compound contaminant-containing gaseous effluent having gross solid and liquid particulate contaminants entrained therein; disentraining such particulate contaminants from the effluent and subsequently passing the effluent through at least one gas/liquid contacting device irrigated with an aqueous liquid irrigant introduced into the device to condense and absorb phosphoric acid vapor contained in the effluent to form phosphoric distillate acid solution containing extremely small amounts of sulfur, iron, and aluminum and containing neither fluorine nor water-insoluble solids and to vaporize substantially all of the fluoride compound contaminants by separately withdrawing the substantially pure distillate acid solution as a liquid effluent and said vaporized fluoride compound contaminants as a gaseous effluent from said contacting device.

2. A process according to Claim 1, in which said gas/liquid contacting device is irrigated with a phosphoric acid solution obtained by and used for scrubbing the effluent flowing from said contacting device.

3. Apparatus comprising a submerged combustion evaporator adapted to concentrate a wet-process phosphoric acid solution to a $P_2O_5$ content not less than 68% (IFB) by weight and to produce a phosphoric acid vapor-containing gaseous effluent containing gross liquid and solid particulate contaminants entrained therein; a disentrainment device adapted to remove such entrained contaminants while permitting the phosphoric acid vapor to pass therethrough; means for conveying the effluent from the disentrainment device to an irrigated gas/liquid contacting device with an aqueous liquid irrigant thereby selectively to condense and absorb substantially fluoride-free phosphoric acid vapor contained in said effluent; means for recovering irrigant solution as a distillate acid containing phosphoric acid, together with extremely small amounts of sulfur, iron and aluminum and neither fluorine nor water-insoluble solids, selectively condensed from the effluent; a scrubber downstream of said contacting device; a scrubbing liquid circuit including said scrubber, and a gas/liquid separator downstream of said scrubber, means for feeding scrubbing liquid from said circuit as irrigant solution to said contacting device; and means for maintaining the volume of scrubbing liquid in said circuit by addition of water thereto.